United States Patent
Cottet et al.

(10) Patent No.: US 11,993,365 B2
(45) Date of Patent: May 28, 2024

(54) AIRCRAFT TURBINE ENGINE COMPRISING VARIABLE-PITCH PROPELLER BLADES

(71) Applicant: SAFRAN AIRCRAFT ENGINES, Paris (FR)

(72) Inventors: Clement Cottet, Moissy-Cramayal (FR); Vivien Mickael Courtier, Moissy-Cramayal (FR); Vincent Joudon, Moissy-Cramayal (FR); Regis Eugene Henri Servant, Moissy-Cramayal (FR); Laurent Jablonski, Moissy-Cramayal (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/006,344

(22) PCT Filed: Jul. 15, 2021

(86) PCT No.: PCT/FR2021/051316
§ 371 (c)(1),
(2) Date: Jan. 24, 2023

(87) PCT Pub. No.: WO2022/018359
PCT Pub. Date: Jan. 27, 2022

(65) Prior Publication Data
US 2023/0286649 A1    Sep. 14, 2023

(30) Foreign Application Priority Data

Jul. 24, 2020 (FR) ......................................... 2007809
Jul. 24, 2020 (FR) ......................................... 2007812
Mar. 30, 2021 (FR) ......................................... 2103263

(51) Int. Cl.
| B64C 27/78 | (2006.01) |
| B64C 11/06 | (2006.01) |
| F01D 7/00 | (2006.01) |

(52) U.S. Cl.
CPC .............. B64C 27/78 (2013.01); B64C 11/06 (2013.01); F01D 7/00 (2013.01)

(58) Field of Classification Search
CPC ......... B64C 27/78; B64C 11/06; B64C 11/30; B64C 11/301; B64C 11/303;
(Continued)

(56) References Cited

U.S. PATENT DOCUMENTS

2012/0321476 A1* 12/2012 Mackie ..................... F01D 5/30
  29/889.21
2016/0376919 A1* 12/2016 Miller ................... F04D 29/323
  416/220 R
2017/0313404 A1* 11/2017 Colmagro ............... B64C 11/30

FOREIGN PATENT DOCUMENTS

| DE | 4203205 A1 | 8/1993 |
| FR | 3017163 A1 | 8/2015 |
| GB | 0718127 A | 11/1954 |

OTHER PUBLICATIONS

International Preliminary Report on Patentability received for PCT Patent Application No. PCT/FR2021/051316, dated Feb. 2, 2023, 13 pages (5 pages of English Translation and 8 pages of Original Document).

(Continued)

Primary Examiner — Elton K Wong
(74) Attorney, Agent, or Firm — WOMBLE BOND DICKINSON (US) LLP (57) ABSTRACT

An assembly comprising a propeller blade and its system for angularly adjusting the pitch of the blade including a bowl which is radially delimited by an annular wall extending about an axis for adjusting the pitch of the blade, the bowl
(Continued)

having a bottom wall, a free lower end of the root being fitted axially into a complementary housing of the bottom wall in order to rotatably connect the bowl and the blade about the pitch-adjustment axis. The root of the blade comprises a first limiting face that engages with a first abutment face of the bowl to limit the rotation of the blade in the event of breakage of the lower end of the root.

16 Claims, 8 Drawing Sheets

(58) Field of Classification Search
CPC ... B64C 11/305; B64C 11/306; B64C 11/308; B64C 11/32; B64C 11/325; B64C 11/34; B64C 11/343; B64C 11/346; B64C 11/36; B64C 11/38; B64C 11/385; F01D 7/00
See application file for complete search history.

(56) References Cited

OTHER PUBLICATIONS

International Search Report and Written Opinion received for PCT Patent Application No. PCT/FR2021/051316, dated Nov. 11, 2021, 15 pages (7 pages of English Translation and 8 pages of Original Document).

* cited by examiner

AIRCRAFT TURBINE ENGINE COMPRISING VARIABLE-PITCH PROPELLER BLADES

TECHNICAL FIELD OF THE INVENTION

The present invention relates to the field of aircraft turbine engines and in particular to the propulsion propellers of these turbine engines which comprise variable pitch vanes.

TECHNICAL BACKGROUND

An aircraft turbine engine propeller can be ducted, as in the case of a fan for example, or un-ducted, as in the case of an open-rotor architecture for example.

A propeller comprises vanes which may be pitch variable. The turbine engine then comprises a pitch setting system that allows the pitch angle of the vanes to be changed in order to adapt the thrust generated by the propeller to the different phases of flight.

The introduction of a pitch setting system of the vane implies to provide a safety device referred to as feathering system. This system allows the vane to be brought back to a "feathered" safety pitch angle which minimises aerodynamic drag in the event of a failure of the pitch setting system. The failure may, for example, be a failure in an element of the kinematic chain, a breakdown of the actuator, etc.

Such a safety device is required because a propeller blade operating at an unintended pitch can degrade engine operation. It can, for example, induce to a loss of efficiency but also reduce the operability. In some cases, a vane at a pitch angle that is not appropriate for the flight conditions may even generate an excessive drag that makes the aircraft uncontrollable. This is why such excessive drag is classified as "hazardous propeller effects" by the "Certification Specification for Propellers", a regulation issued by the European Aviation Safety Agency (EASA).

If a propeller blade is considered a flat plate, the feather pitch angle is such that the vane is aligned with the engine axle (chord parallel to the engine axle). However, a propeller blade usually has a natural twist. The feather pitch angle is then determined at a particular section of the blade whose chord will be aligned with the motor axle, for example a section taken at about 75% of the length of the blade from the hub.

The safety devices to automatically feather the blade can be various: there are mechanical systems with counterweights, hydraulic systems, etc. The most common solution is the arrangement of a counterweight attached to the vane at a well-defined angular position that allows, through an effect of inertia with the speed of rotation of the propeller, to brought the vane back to its pitch angle referred to as "feather".

Offset counterweight systems are also known. In this case, the restoring torque generated by the counterweight is transmitted to the vane by means of a kinematic chain, e.g. by gears. The addition of counterweights can also allow to reduce the power of the actuator of the pitch setting system.

When the counterweight is not attached to the vane, the restoring torque towards the feather pitch angle is transmitted by parts forming a kinematic chain. Therefore, in case of failure of one of these intermediate parts, the feathering capability is lost.

The invention aims to find a solution to deal with a situation of loss of control of the pitch angle of the vane in the event of failure of an element of the kinematic chain between the vane and the actuator of the pitch setting system and/or between the vane and the safety device.

SUMMARY OF THE INVENTION

The invention proposes an assembly comprising a propeller vane and a system for setting the pitch of the vane about a pitch setting axis, for an aircraft turbine engine, the vane having a root extending from an upper end connected to a blade of the vane to a free lower end, the system for setting the pitch the vane comprising a cup which is delimited radially by an annular wall extending about the pitch setting axis, the cup comprising a bottom wall and an upper opening through which the root is intended to be inserted axially into the cup, the free lower end of the root being nested axially into a housing complementary to the bottom wall in order to connect the cup and the vane in rotation about the pitch setting axis.

The assembly according to the invention is characterised in that the root of the vane comprises at least one first radial limiting face which is intended to cooperate with at least one associated first radial stop face of the cup in order to limit the rotation of the vane in a first orientation about the pitch setting axis with respect to the cup in the event of failure of the lower end of the root.

This allows to provide a second path for the transmission of the pitch setting control torque of the vane in the event of failure of the free lower end which normally ensures this function.

According to another characteristic of the invention, the root of the vane comprises at least one second radial limiting face which is intended to cooperate with at least one associated second radial stop face of the cup in order to limit the rotation of the vane in a second orientation about the pitch setting axis relative to the cup in the event of failure of the lower end of the root.

This allows to control the rotation of the vane about its pitch setting axis in both orientations in the event of failure in the free lower end of the root.

According to another characteristic of the invention, an angular space is reserved between each radial limiting face and its associated stop face when the vane is connected in rotation to the cup by means of its free lower end.

This allows to ensure that the vane can be easily mounted in the cup. In addition, this allows to ensure that during normal operation, the pitch setting control torque of the vane only passes through the lower end of the root.

According to another characteristic of the invention, the angular space is between 2° and 10°, preferably the angular space is 5°.

This allows a sufficient clearance for the vane to be mounted while limiting the angular deflection of the vane in the cup in the event of failure in the lower end of the root.

According to another characteristic of the invention, the assembly comprises retention means for axially attaching the root in the cup.

According to another characteristic of the invention, the root has a bulged stretch, referred to as "bulb", which is arranged axially between the blade and the free lower end, the pitch setting system comprising an annular immobilisation ring which is configured to be mounted inside the cup and to cooperate respectively with the bulb and the annular wall of the cup in order to secure the root axially to the cup.

According to another characteristic of the invention, the stop faces and the limiting faces are arranged axially below the immobilisation ring.

According to a further characteristic of the invention, the limiting faces are arranged substantially at the level at which the bulb has maximum radial dimensions.

In a further characteristic of the invention, the root comprises a body housed in an annular barrel prior to its insertion into the cup, each limiting face being formed in one part with the barrel.

According to a further characteristic of the invention, the at least one first limiting face and the at least one second limiting face are arranged on a common limiting finger which projects radially outwards relative to the root.

According to a further characteristic of the invention, the limiting finger is received in an associated stop notch of the cup which is circumferentially delimited by a first stop face and by a second stop face.

According to another characteristic of the invention, a radial space is reserved between the limiting finger and the internal face of the annular wall of the cup.

According to a further characteristic of the invention, the at least one first stop face and the at least one second stop face are arranged in opposition on a common stop finger which projects radially inwards relative to the annular wall of the cup.

According to another characteristic of the invention, the stop finger is received in an associated limiting notch of the root which is circumferentially delimited by a first limiting face and by a second limiting face.

According to another characteristic of the invention, a radial space is reserved between the stop finger and the root.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

In the following description, elements with an identical structure or similar functions will be referred to by a same reference.

In the remainder of the description, an axial orientation along the pitch setting axis "A" of the vane is adopted in a non-limiting way, from the bottom, near the root of the vane, upwards, near the free end of the vane. Radial directions extending orthogonally to the pitch setting axis from the inside, close to the pitch setting axis, outwards are also adopted. A circumferential direction directed along a circular arc centred on the pitch setting axis 'A' is also adopted. The circumferential direction is thus orthogonal to the radial and axial directions.

Figure 1:
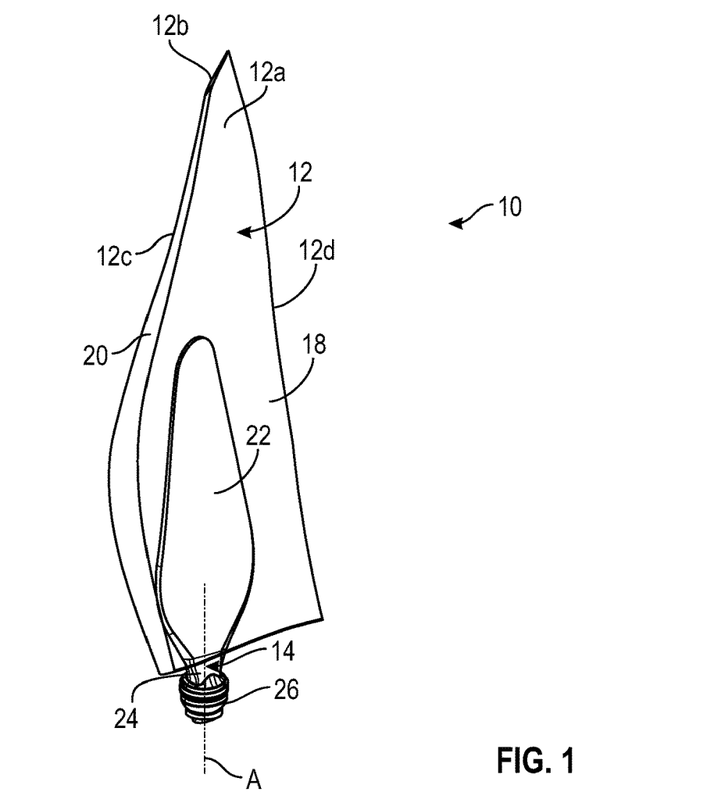
FIG. 1 is a schematic perspective view of a propeller vane for an aircraft turbine engine, and illustrates the present invention.

FIG. 1 shows a vane 10 for a propeller of an aircraft turbine engine, this propeller being either ducted or un-ducted. As an example, the propeller is not un-ducted here.

The vane 10 comprises a blade 12 which extends generally along the axis "A" and is connected to a root 14. The axis "A" is an axis of elongation of the vane 10 and the blade 12 and in particular a pitch setting axis "A" of the vane 10, i.e. the axis about which the pitch angle of the vane 10 is adjusted. It is also generally an axis that extends along a radius from the axis of rotation of the propeller equipped with this vane 10.

The blade 12 has an aerodynamic profile and comprises an intrados 12a and an extrados 12b which are connected by an upstream leading edge 12c and a downstream trailing edge 12d, the terms upstream and downstream referring to the flow of the gases around the blade 12 in operation. The chord of a blade section 12, taken orthogonally to the pitch setting axis "A", is determined to be a straight line connecting the leading edge to the trailing edge.

The blade 12 has a free upper end, referred to as summit, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerizable resin, such as an epoxy resin, which will impregnate the preform. After the blade 12 has cured and hardened, its leading edge 12c is usually reinforced by a metal sheath 20 which is fitted and attached, for example by gluing.

The vane 10 comprises a spar 22. The spar 22 comprises a portion forming a core of the blade 12. The portion of the spar 22 forming the core of the blade 12 is intended to be inserted into the preform 18 prior to the resin injection. The spar 22 also comprises a portion that extends on the opposite side of the summit of the blade 12 to form the root 14.

The spar 22 is preferably made of composite material. For example, it is a composite material with an epoxy organic matrix reinforced with 3D woven carbon fibres, with the warp direction predominantly oriented axially along the pitch setting axis "A" and the weft predominantly oriented along the chord of the blade 12 at the height of the aerodynamic duct.

Alternatively, the spar can also be formed by a more mechanically advantageous assembly of different organic matrix composite materials (thermoset, thermoplastic or elastomer) reinforced with long fibres (carbon, glass, aramid, polypropylene) in several fibre arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade 12.

The sheath 20 may be titanium or titanium alloy, stainless steel, steel, aluminium, nickel, etc. The intrados 12a or even the extrados 12b of the blade 12 may be covered with a polyurethane film for the protection against erosion.

Figure 2:
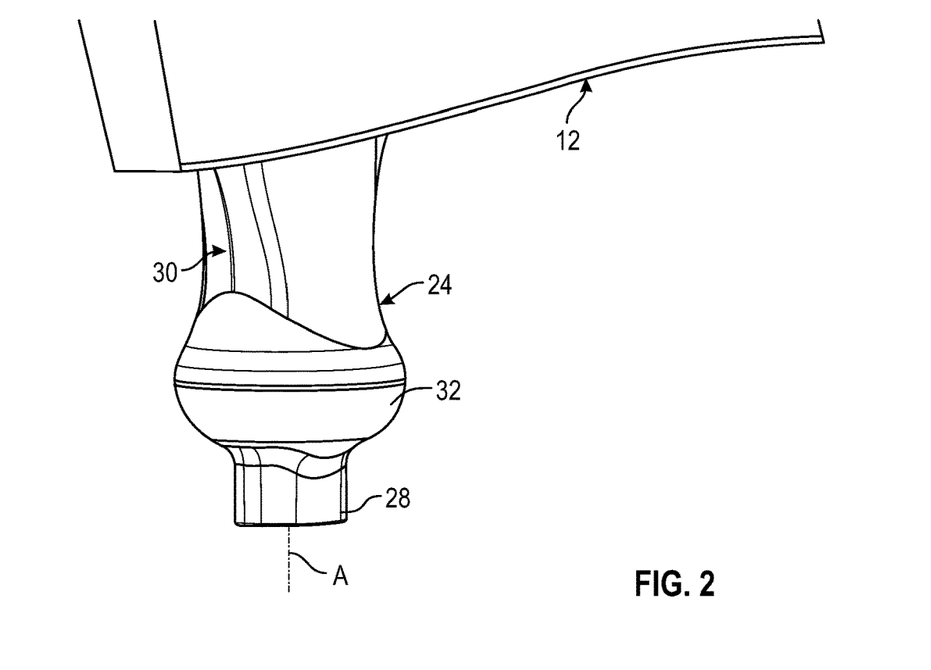
FIG. 2 is a larger scale view of a portion of FIG. 1 and shows the root of the vane.

The root 14 comprises a body 24 which has a particular shape best seen in FIG. 2. The body 24 is here made in one part with the spar 22.

The body 24 essentially comprises three portions:
a free lower end 28 located opposite the blade 12,
an upper stilt 30 located on the side of the blade 12, and
a bulged stretch, referred to as "bulb" 32, located between the free end 28 and the stilt 30.

The body 24 is preferably solid, i.e. it has no hollow recessed portion.

Figure 4:
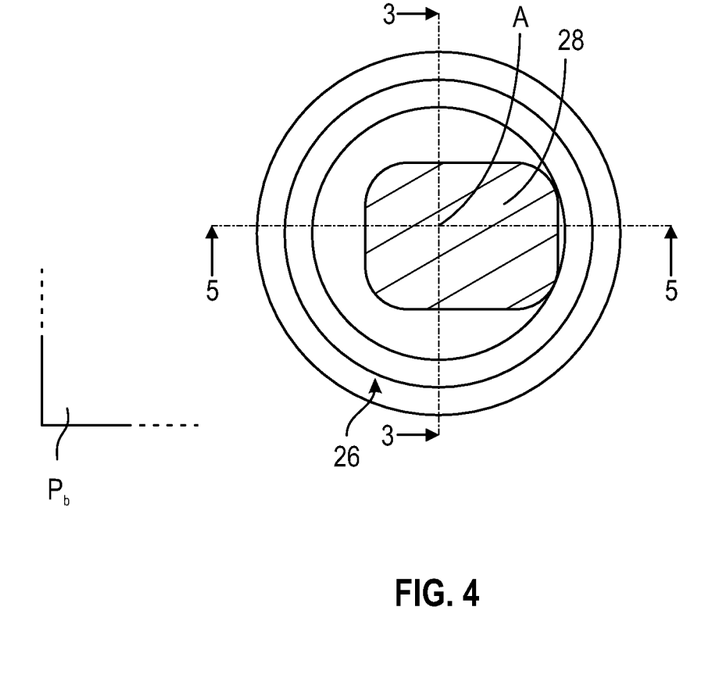
FIG. 4 is a cross-sectional view according to the sectional plane Pb of FIG. 3, which shows the shape and the position of the free lower end of the root in relation to the pitch setting axis.
Figure 5:
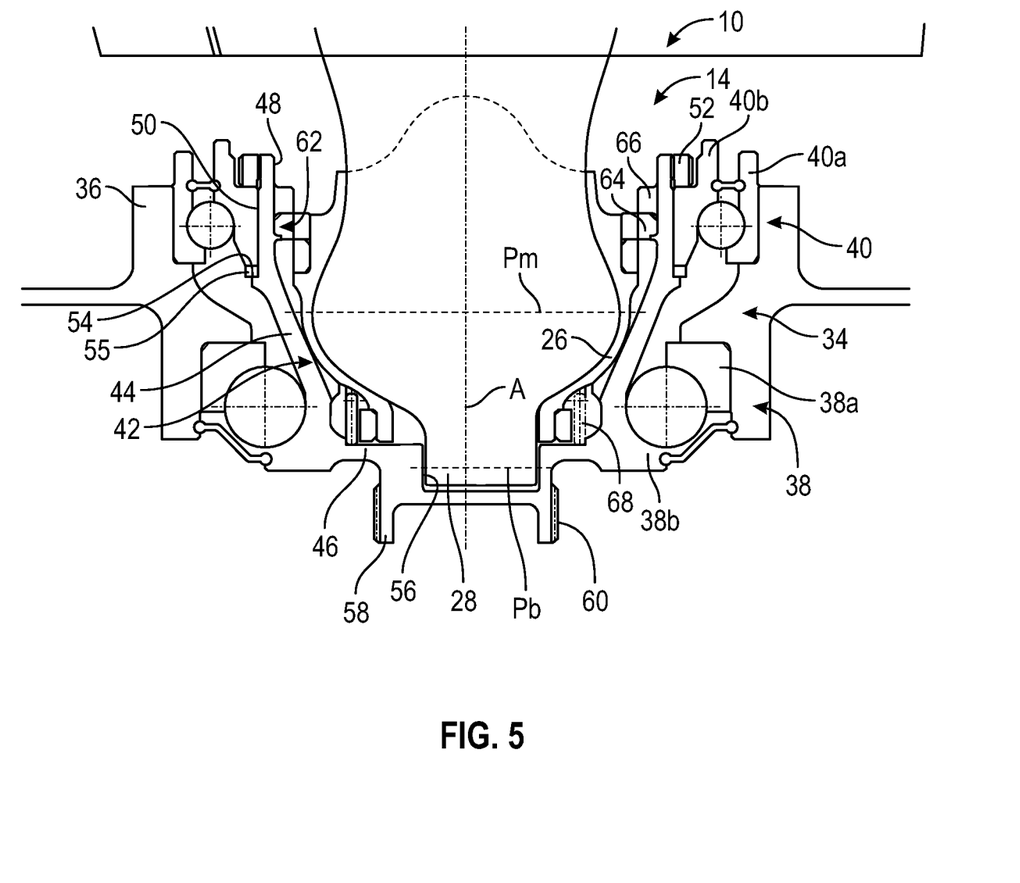
FIG. 5 is an axial torque view taken along the cross-sectional plane 5-5 of FIG. 4.

The free end 28 is generally non-circular in cross-section, in this case polygonal. As illustrated in FIGS. 4 and 5, this lower free end 28 is offset from the pitch setting axis "A" to achieve a keying or an indexing, as will be explained in more detail below.

Figure 3:
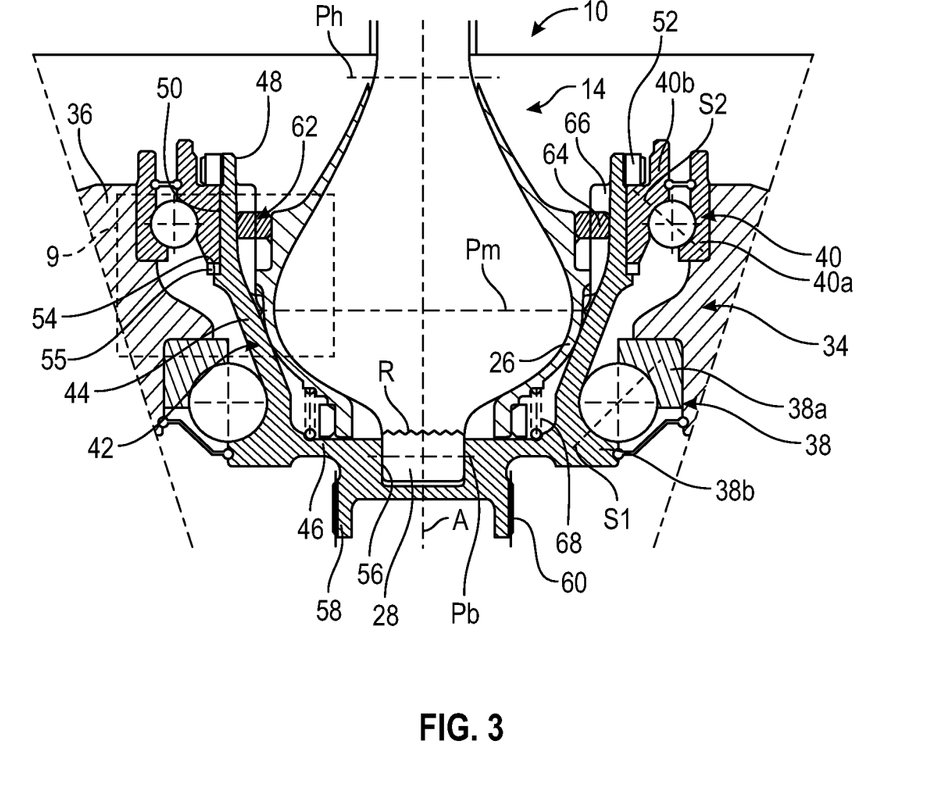
FIG. 3 is an axial cross-sectional view according to the sectional plane 3-3 of FIG. 4, which shows the root of the vane of FIG. 1 attached in a cup of a pitch setting system.

Referring to FIG. 3, Pb is defined as a transverse plane, i.e. a plane perpendicular to the pitch setting axis "A", passing substantially through the middle of the free lower end 28, measured along the pitch setting axis "A". This plane Pb is referred to as low or lower plane. FIG. 4 shows the cross-sectional shape of the lower free end 28 in this plane Pb. This section, referred to as low section, has a value or a surface area, for example a maximum, and is generally rectangular in shape in the example shown.

As will also be described below, the free lower end 28 is configured to cooperate with a system 34 for setting the pitch of the vane 10.

Referring again to FIG. 2, the stilt 30 has a relatively complex shape which allows to provide a transition between the root 14 and the spar portion 22 forming the core of the blade 12. With reference to FIG. 3, Ph is defined as a transverse plane passing through the stilt 30, and in particular its lower stretch. This plane Ph is referred to as high or upper plane. In this plane, the stilt 30 may have a non-circular cross-sectional shape, for example oval, oblong, square or rectangular. This section, referred to as the high section, has a value or surface area, for example a maximum.

The bulb 32 has a generally bulged or domed shape, this bulging or doming extending around the pitch setting axis "A".

Pm is defined as a median plane passing through the bulb 32, and in particular in its portion of greatest cross-section, hereafter referred to middle section. This plane Pm is referred to as mean plane. In this plane, the bulb 32 may have a circular shape in section, although this section is not limiting.

It is understood that the plane Pm is located between the planes Pb and Ph. The maximum cross-sectional dimensions of the bulb 32 decrease from the plane Pm to the plane Ph, and from the plane Pm towards the plane Pb.

The vane 10 is intended to be mounted in a pitch setting system 34 which allows its pitch angle to be varied about the pitch setting axis "A" relative to a hub 36 of the propeller. The pitch angle is defined as the angle that the chord of a given section, for example a section located at 75% of the length of the blade 12 measured from the root 14, forms with respect to the axis of rotation of the propeller (not shown). A pitch angle of 0° will hereafter be referred to as "feather" pitch angle.

For this purpose, the pitch setting system 34 comprises bearings 38, 40. The bearings 38, 40 are here two in number and are respectively a lower bearing 38 and an upper bearing 40.

The bearings 38, 40 are of the ball rolling type. In the example shown, they have different diameters and their balls also have different diameters.

The lower bearing 38 extends substantially between the planes Pm and Pb and thus around a lower portion of the bulb 32. This lower bearing 38 has a smaller diameter than the upper bearing 40, and its balls have a larger diameter than those of the upper bearing 40.

The lower bearing 38 is also angular contact. In the example shown, the bearing points or surfaces of the balls on the raceways of their rings 38a, 38b are located on a frustoconical surface S1 which extends along the pitch setting axis "A" and whose largest diameter is located on the side of the summit of the vane 10.

The upper bearing 40 extends substantially between the planes Pm and Ph and thus around an upper portion of the bulb 32. The upper bearing 40 is also angular contact. In the example shown, the bearing points or surfaces of the balls on the raceways of their rings 40a, 40b are located on a frustoconical surface S2 which extends along the pitch setting axis "A" and the largest diameter of which is located on the side of the free lower end 28 of the root 14 of the vane 10.

FIG. 3 illustrates an example embodiment of the pitch setting system 34.

The pitch setting system 34 comprises a cup 42 forming a pitch pivot about the axis "A" of the vane 10 relative to the hub. The cup 42 comprises an annular wall 44 extending around the pitch setting axis "A". The annular wall 44 radially delimits an internal volume of the cup 42. The internal volume of the cup 42 is closed by a bottom wall 46 which extends opposite the free end 28 of the root. The cup 42 has at its upper axial end an opening 48 which is radially delimited by an upper end edge of the annular wall 44. The free lower end 28 and the bulb 32 of the root 14 are intended to be inserted axially into the cup 42 through the upper opening 48.

The annular wall 44 and the bottom wall 46 are produced in one part.

As can be seen in FIG. 3, the cup 42 is designed to support the bearings 38, 40 which ensure the centring and the guiding of the cup 42 about the pitch setting axis "A" relative to a hub 36 of the turbine engine.

The bearings 38, 40 may form part of the pitch setting system 34. In particular, at least one of the guide bearings 38, 40 may have its internal ring integrated into the cup 42. This is the case with the lower bearing 38, which has its internal ring 38b integrated into the cup 42. In practice, this means that the cup 42 comprises a raceway at its external periphery on which the balls of the lower bearing 38 roll directly. This raceway comprises an annular surface with a concave curved section. This raceway is located at the lower end of the cup 42 and the annular wall 44. The external ring 38a of the bearing 38 is attached to the hub 36, for example by shrink-fitting. Furthermore, the cup 42 is advantageously designed to apply a pre-stress to the bearing 38.

The external ring 40a of the bearing 40 is attached to the hub 36, for example by shrink-fitting. Its internal ring 40b is engaged on and around the free upper end of the cup 42 and the annular wall 44. This end of the annular wall 44 comprises an external cylindrical surface 50 for mounting the internal ring 40b as well as an external thread for screwing on a nut 52 intended to be axially supported on the internal ring 40b to maintain it clamped axially against an external cylindrical shoulder 54 of the cup 42.

Advantageously, a shim 55 is interposed axially between the internal ring 40b and the external cylindrical shoulder 54. This shim 55 is intended to compensate for manufacturing tolerances of the hub 36 by adjusting the position of the internal ring 40b. In particular, this allows an optimum preload to be applied to the lower rolling bearing 38 when the nut 52 is clamped.

The bottom wall 46 of the cup 42 is configured to cooperate in a form-fitting manner with the free lower end 28 of the root 14 so that the cup 42 is secured in rotation to the root 14 about the pitch setting axis "A".

In the present case, it is understood that the bottom wall 46 comprises a housing 56 having a cross-section complementary to that of the free lower end 28 of the root 14. The cross-section of the housing 56 is thus non-circular, and in particular rectangular. The housing 56 is thus configured to receive the free lower end 28, as shown in FIGS. 3, 4 and 5. As can be seen in FIGS. 4 and 5, this housing 56 is eccentric to the pitch setting axis "A" in a manner similar to the free lower end 28. This eccentricity allows an indexing and a keying when inserting and mounting the root 14 in the cup 42, with only one engagement position of the free lower end 28 in the housing 56 being possible.

The housing 56 is located on an upper or internal face of the bottom wall 46 of the cup 42, which is thus located inside the cup 42 and oriented on the side of the root 14.

The pitch setting system 34 generates a torque at the root 14 of vane 10 which counteracts the torsional moment resulting from aerodynamic and centrifugal forces. It is advantageous to nest the free lower end 28 directly into the housing 56, without the interposition of an insert, in order to directly constrain the rotation of the root 14. This provides a more direct force path, with the torsional moment applied directly to the root 14.

The bottom wall 46 comprises a lower or external face, which is located on the side opposite the root 14, and which comprises a cylindrical extension 58 extending along the pitch setting axis "A" and comprising an external thread or external straight splines 60 for the rotational coupling of the pitch setting system 34 with an actuator which allows the pitch angle to be controlled by means of a transmission mechanism which is not illustrated.

The pitch setting system 34 further comprises retention means for axially attaching the root 14 in the cup 42. To this end, the pitch setting system 34 herein comprises an annular immobilisation ring 62 which is configured to be mounted within the cup 42 and to cooperate respectively with the bulb 32 and the annular wall 44 of the cup 42 in order to axially retain the root 14 in the cup 42. The immobilisation ring 62 only allows the root 14 to be axially secured to the cup 42, the root 14 being secured in rotation to the cup 42 by the nesting of its lower free end 28 in the housing 56.

By way of non-limiting example, in the embodiment shown in FIG. 3, this immobilisation ring 62 is a dog clutch ring 62 which comprises external dog teeth 64 configured to cooperate with complementary internal dog teeth 66 of the annular wall 44 of the cup 42. An elastic member 68 is provided interposed between the root 14 and the bottom wall 46 of the cup 42 to force the root 14 against the immobilisation ring 62 which is itself pushed against the internal dog teeth 66 of the cup 42 in order to provide the axial immobilisation of the root 14 in the cup 42.

Figure 6:
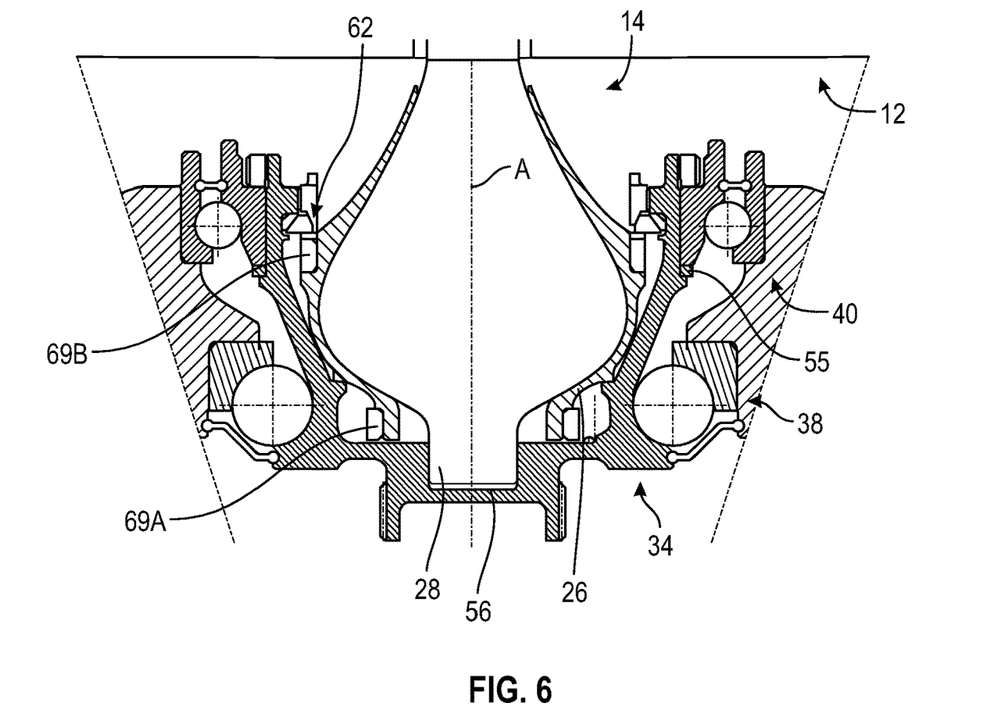
FIG. 6 is a similar view to FIG. 3 which shows an alternative embodiment of the pitch setting system.

In an alternative embodiment of the immobilisation ring 62 shown in FIG. 6, it has a wedge shape in cross-section and is configured, under the effect of centrifugal forces during operation, to be biased axially outwards from the cup 42 and to maintain the root 14 of a vane 10 axially clamped by wedge effect.

It may happen that the actuator of the pitch setting system 34 is faulty. In this case, a safety device (not shown) is provided to allow to restore the vanes 10 to their "feathered" pitch angle so as to limit the effects of drag on the vanes 10, and thus allow the pilot to maintain control of the aircraft.

As a non-limiting example, the safety device comprises a counterweight mounted movable around an axis and which, under the effect of the rotation of the propeller, is constantly restored towards a safety position corresponding to the feathering pitch angle of the vane 10. The counterweight thus generates a restoring torque around its axis of rotation. In normal operation of the pitch setting system 34, the actuator has a sufficient power to overcome the restoring torque and thus control the vane 10 to a desired pitch angle.

The arrangement of the root 14 in the cup 42 does not allow a sufficient space to attach the counterweight directly to the root 14 of the vane 10. The counterweight is therefore attached to the outside of the cup 42. The counterweight may be rotatably mounted about an axis other than the pitch setting axis "A" or it may be rotatably mounted about the pitch setting axis "A", for example by being attached to the cup 42. In all cases, the restoring torque is transmitted to the root 14 by means of the cup 42.

As previously explained, the cup 42 and the root 14 of vane 10 are secured in rotation by means of the free lower end 28 of the root 14. In the event of failure of the free lower end 28 of the root 14 of the vane 10, for example along the broken line indicated by the reference "R", although still retained axially in the cup 42 by cooperation between the immobilisation ring 62 and the bulb 32, the vane 10 would then be free to rotate about the pitch setting axis "A" with respect to the cup 42. In such a case, neither the torque provided by the actuator nor the restoring torque provided by the counterweight could be transmitted to the vane 10, which could rotate uncontrolled in the cup 42. Although the probability of such an event occurring is very low, it is nevertheless preferable to provide a back-up solution to restore the control of the orientation of the vane 10 around its pitch setting axis "A".

Figure 7:
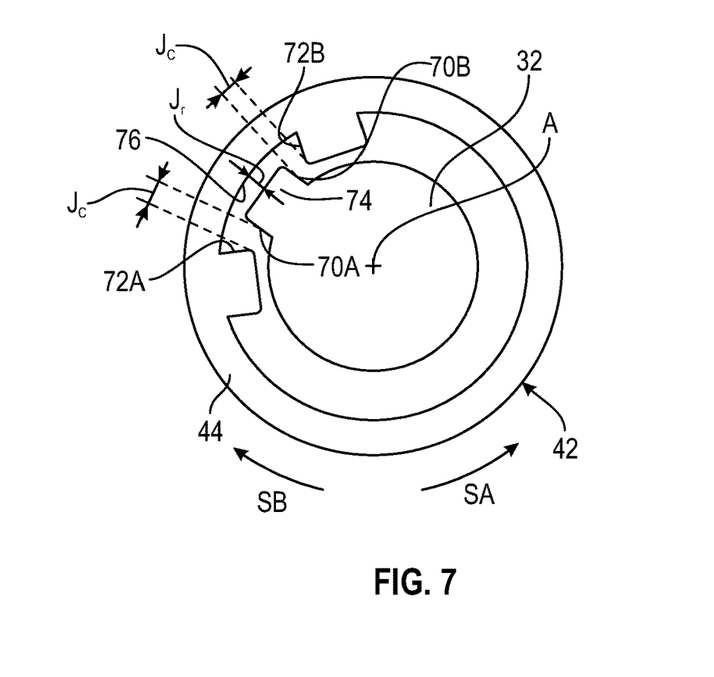
FIG. 7 is a schematic cross-sectional view according to the sectional plane Pm of FIG. 3, which schematically represents a first embodiment of the invention in which the root of the vane comprises a limiting finger received in a stop notch of the cup.
Figure 8:
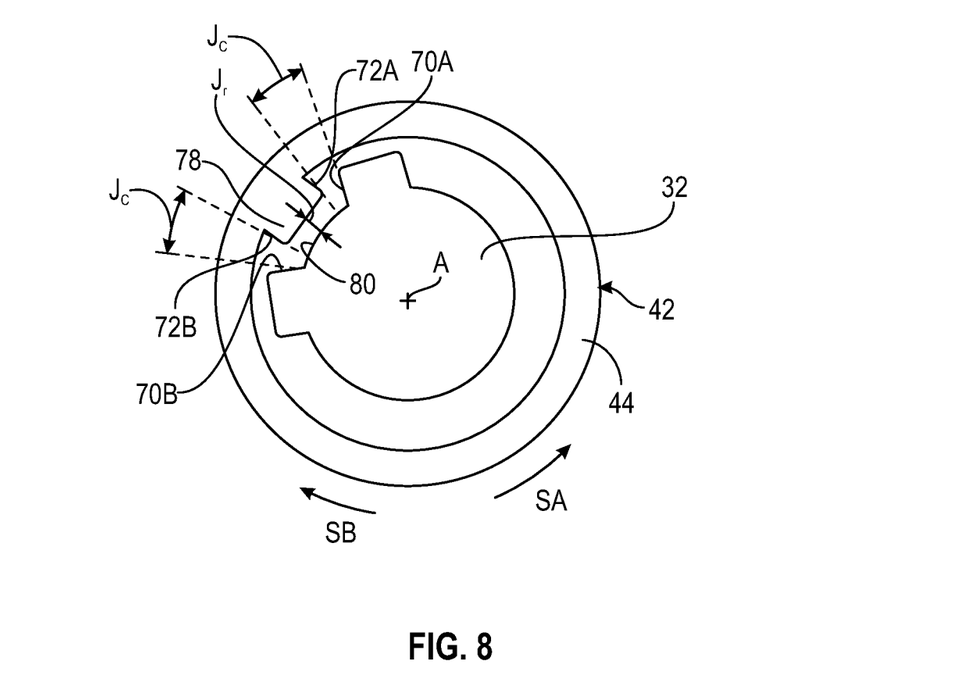
FIG. 8 is a similar view to FIG. 7 which schematically represents a second embodiment of the invention in which the root of the vane comprises a limiting notch in which a stop finger of the cup is received.

To solve this problem, the invention proposes to provide a secondary path for the transmission of the torque between the cup 42 and the root 14 in the event of failure in the free lower end 28. Two alternative embodiments of the principle of the invention are illustrated in FIGS. 7 and 8.

To this end, the root 14 of the vane 10 comprises at least one first radial limiting face 70A which is intended to cooperate with at least one first associated radial stop face 72A of the cup 42 in order to limit the rotation of the vane 10 in a first orientation "SA" about the pitch setting axis "A" with respect to the cup 42 in the event of failure of the free lower end 28 of the root 14.

The first orientation "SA" of rotation corresponds to the orientation of rotation of the vane 10 to return towards its feather pitch angle when the propeller vanes 10 are at a feather angle to generate a thrust to move the aircraft forward. The restoring torque generated by the safety device thus tends to make the vane 10 rotate in the first orientation "SA" of rotation.

However, sometimes an aerodynamic torque is applied to the vane 10 by the flow of the air. The total torque that can be applied to the vane 10, i.e. the sum of the restoring torque and the aerodynamic torque, may also tend to rotate the vane 10 in a second orientation "SB", opposite to said first orientation "SA".

In this respect, it is preferable that the root 14 of the vane 10 comprises at least one second radial limiting face 70B which is intended to cooperate with at least one associated second radial stop face 72B of the cup 42 to limit the rotation of the vane 10 in the second orientation "SB" about the pitch setting axis "A" with respect to the cup 42 in the event of failure of the free lower end 28 of the root 14.

An angular space "Jc" is reserved circumferentially between each radial limiting face 70A, 70B and its associated stop face 72A, 72B when the vane 10 is connected in rotation to the cup 42 by means of its free lower end 28.

The angular space "Jc" is chosen so as to allow an easy mounting between the root 14 and the cup 42.

In addition, the angular space "Jc" allows to ensure that when the root 14 is rotatably connected to the cup 42 by its free lower end 28, no force will pass through the radial faces 70 and the stop faces 72A, 72B.

The angular space "Jc" also allows to make it easy to detect a problem of failure of the free lower end 28 of the root 14, as it can then be seen that the vane 10 has a deflection in rotation about its pitch setting axis "A" in relation to the cup 42 simply by exerting a manual force to rotate the vane 10.

However, this angular space "Jc" must remain small enough to limit the aerodynamic unbalance and the vibrations during propeller operation.

The angular space "Jc" is preferably between 2° and 10°. It is preferably equal to 5°.

Figure 9:
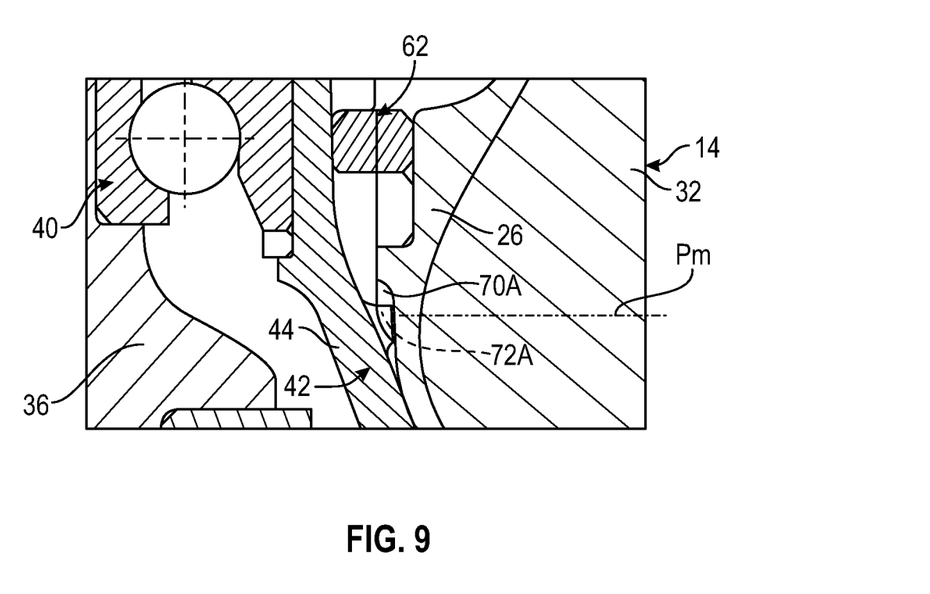
FIG. 9 is a larger scale view of the portion shown in the window 9 of FIG. 3 showing a limiting face of the root and a stop face of the cup.

As illustrated in FIG. 3, and in more detail in FIG. 9, to benefit from a better leverage, the limiting faces 70A, 70B are here arranged substantially at the level of the plane "Pm" at which the bulb 32 has a maximum radial dimension. The stop faces 72A, 72B and the limiting faces 70A, 70B are here arranged axially below the immobilisation ring 62.

In the embodiments shown in FIGS. 3 and 6, the root 14 comprises essentially two portions, namely the body 24 and an annular barrel 26 which extends around the body 24 and a pitch setting axis "A" of the vane 10. The annular barrel 26 is attached to the body 24.

The barrel 26 is preferably independent of the pitch setting system 34.

Figure 10:
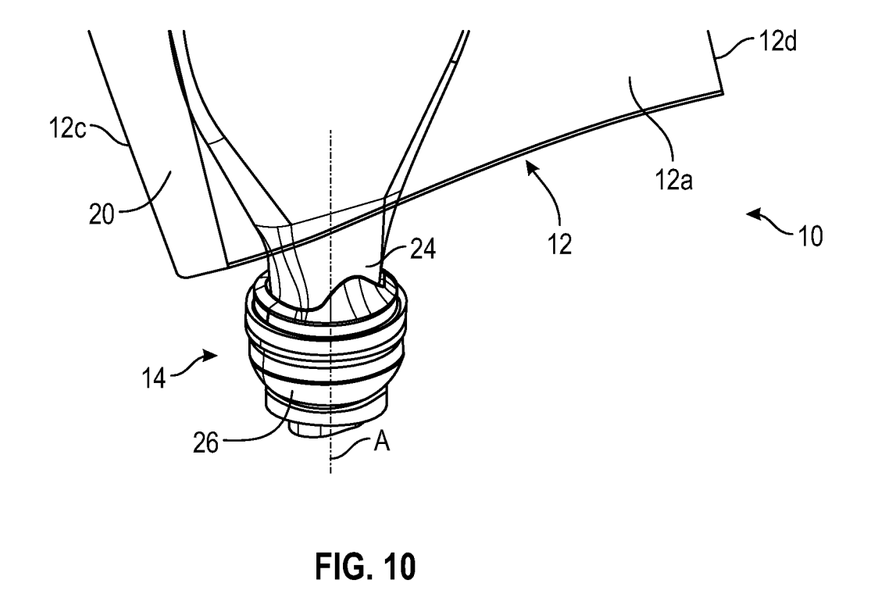
FIG. 10 is a similar view to FIG. 2, which shows an alternative embodiment of the root of the vane in which the root is equipped with a barrel.
Figure 11:
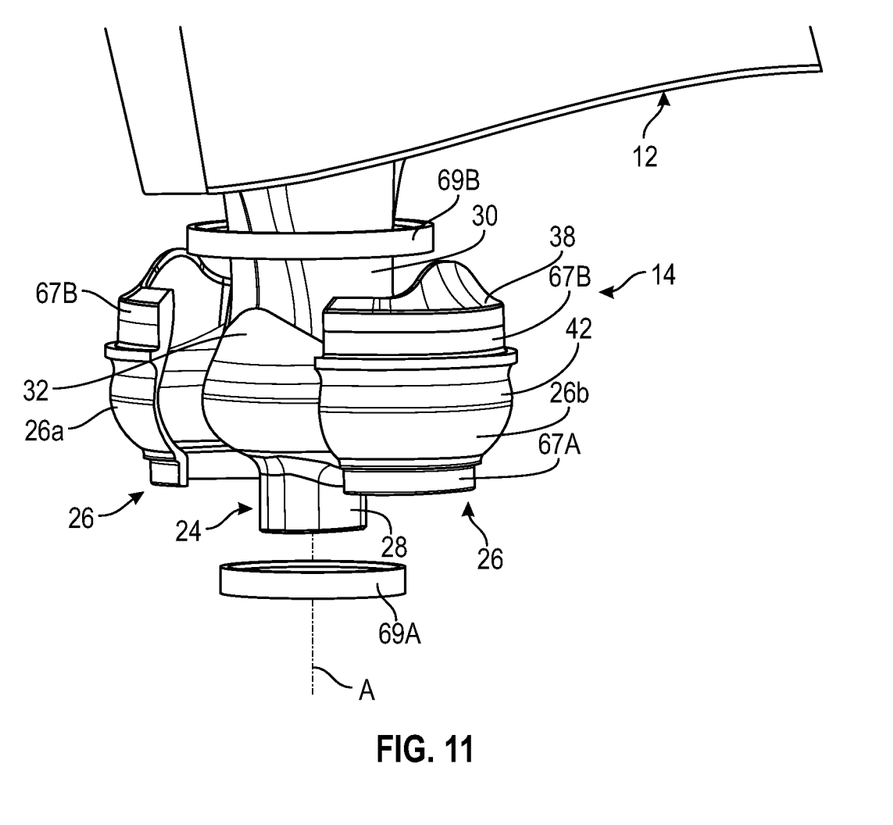
FIG. 11 is an exploded view of the root in FIG. 10 showing the two half-shells of the barrel.

As illustrated in more detail in FIGS. 10 and 11, the barrel 26 is produced of two half-shells 26a, 26b, as seen in FIG. 3, which are fitted and attached to the body 24, for example one on the side of the intrados 12a of the blade 12 and the other on the side of the extrados 12b of the blade 12. The half-shells 26a, 26b are thus joined at the level of a joint plane which passes through the pitch setting axis "A" and which extends substantially parallel to a chord of the blade 12.

The barrel 26 is advantageously attached to the body 24, preferably by gluing. The glue extends between the barrel 26 and the body 24, all around the pitch setting axis "A".

The barrel 26 is preferably metallic (steel, titanium or titanium alloy such as TA6V). The glue is, for example, an epoxy glue filled with thermoplastic or elastomeric nodules or reinforced with a fabric. This glue assembling method is particularly suitable because of the large contact surface area between the cavity of the barrel 26 and the body 24, which can be composite.

As can be seen in FIGS. 3 and 6, the barrel 26 covers and conforms to at least one portion of the bulb 32 and the stilt 30, and has a complementary cross-sectional shape to the bulb 32 at the level of the median plane "Pm" and to the stilt 30 at the level of the top section "Ph".

The barrel 26 comprises two cylindrical surfaces 67A, 67B for mounting shrink-fitting rings 69A, 69B. The shrink-fitting rings allow to maintain the half-shells 26a, 26b clamped one against the other and to the body 24. The shrink-fitting rings 69A, 69B extend around the pitch setting axis "A".

Each limiting face 70A, 70B is here formed in one part with the barrel 26.

Figure 12:
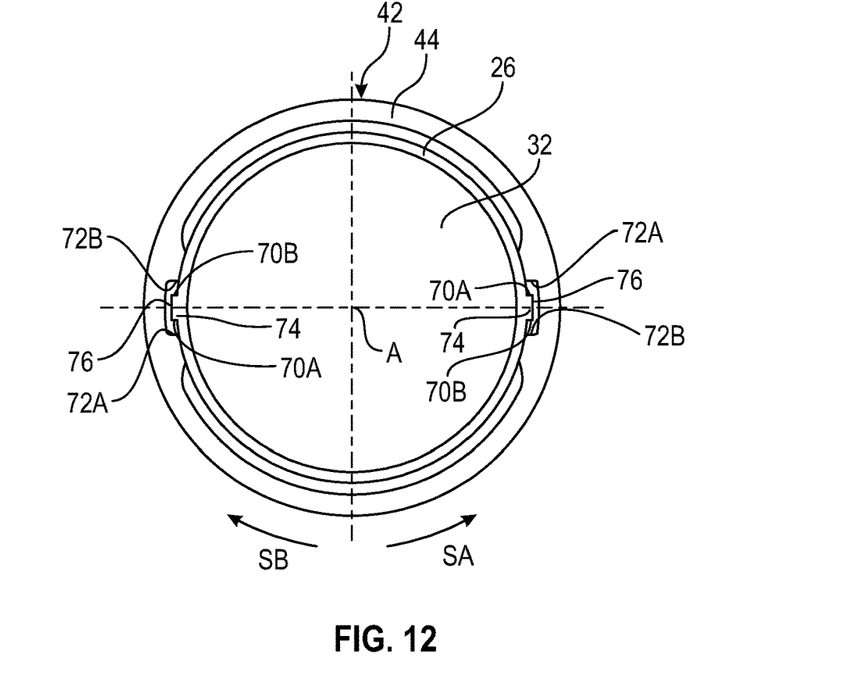
FIG. 12 is a cross-sectional view according to the sectional plane Pm of FIG. 3, which represents the first embodiment of the invention applied to the root of FIG. 10.

According to a first embodiment of the invention, the general principle of which is shown in FIG. 7, and the application of which to a root 14 comprising a barrel 26 is illustrated in FIG. 12, the root 14 is here equipped with a limiting finger 74 which projects radially outwards to a free external end. The limiting finger 74 is delimited in one orientation by a first limiting face 70A and in the other orientation by a second limiting face 70B. The first limiting face 70A and the second limiting face 70B are thus turned in two opposite directions on the common limiting finger 74. Here the limiting finger 74 projects from an external face of the barrel 26.

Advantageously, as shown in FIG. 12, the root 14 is equipped with several limiting fingers 74 to distribute the forces around the pitch setting axis "A". The limiting fingers 74 are, for example, arranged regularly around the pitch setting axis "A".

The root 14 is here equipped with two limiting fingers 74 arranged in opposition in relation to the pitch setting axis "A".

Each limiting finger 74 is received in an associated stop notch 76 produced in the internal face of the annular wall 44 of the cup 42. The stop notch 76 is limited circumferentially in the first orientation "SA" by a first stop face 72A, which is intended to limit the rotation of the vane 10 in the first orientation "SA by contact with the associated first limiting face 70A, and in the second orientation "SB" by a second stop face 72B which is intended to limit the rotation of the vane 10 in the second orientation "SB" by contact with the associated second limiting face 70B.

As previously explained, the limiting finger 74 is received with a circumferential deflection between the two stop faces 72A, 72B such that an angular space "Jc" is reserved circumferentially between each limiting face 70A, 70B of the limiting finger 74 and the associated stop face 72A, 72B of the stop notch 76 when the root 14 of the vane 10 is connected in rotation to the cup 42 by its lower free end 28. More particularly, the limiting finger 74 is then arranged substantially equidistant from the two stop faces 72A, 72B of the associated stop notch 76.

A radial space "Jr" is also reserved between the free external end of the limiting finger 74 and the bottom of the stop notch 76 formed in the internal face of the annular wall 44 of the cup 42. This radial space "Jr" forms a clearance that allows to facilitate the mounting of the root 14 in the cup 42.

Furthermore, to allow the root 14 to be inserted axially into the cup 42, the stop notch 76 is open axially upwards so as to receive the axially limiting finger 74.

Figure 13:
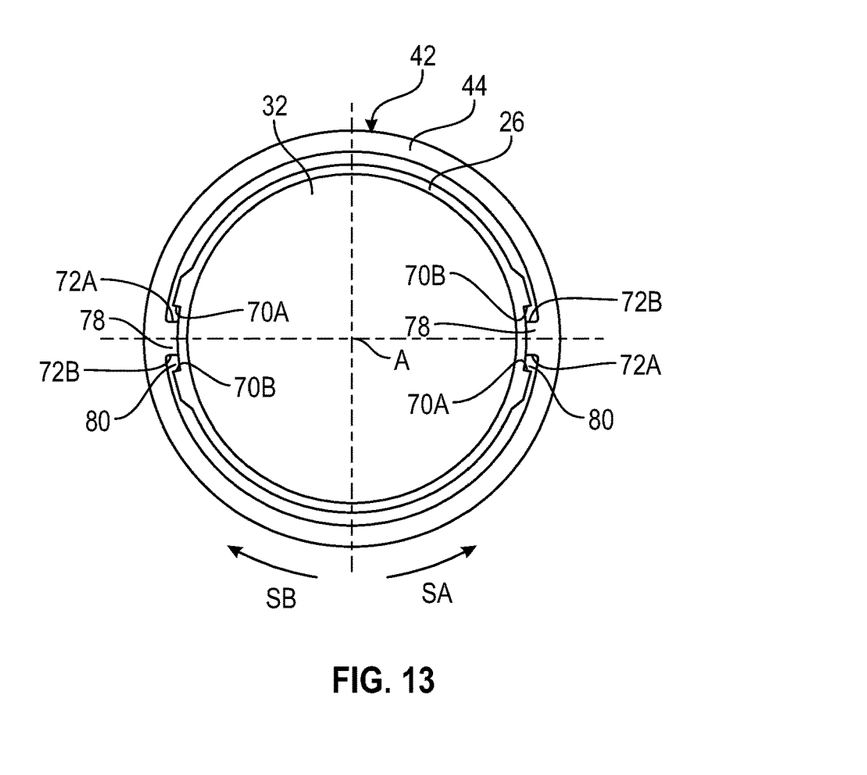
FIG. 13 is a cross-sectional view according to the sectional plane Pm of FIG. 3 which represents the second embodiment of the invention applied to the root of FIG. 10.

A second embodiment of the invention, the general principle of which is shown in FIG. 8, and whose application to a root 14 comprising a barrel 26 is illustrated in FIG. 13, is a mechanical inversion of the first embodiment. Here, the stop faces 72A, 72B are arranged on a stop finger 78, while the limiting faces 70A, 70B delimit a limiting notch 80 produced in the root 14.

The annular wall 44 of the cup 42 is here equipped with a stop finger 78 which projects radially inwards to a free internal end. The stop finger 78 is delimited in one orientation by a first stop face 72A and in the other orientation by a second stop face 72B. The first stop face 72A and the second stop face 72B are thus turned in two opposite directions on the common stop finger 78. Here, the stop finger 78 projects from an internal face of the annular wall 44 of the cup 42.

Advantageously, as illustrated in FIG. 13, the cup 42 is equipped with a number of stop fingers 78 to distribute the forces around the pitch setting axis "A". The stop fingers 78 are, for example, arranged regularly around the pitch setting axis "A".

The cup 42 is here equipped with two stop fingers 78 arranged in opposition to the pitch setting axis "A".

Each stop finger 78 is received in an associated limiting notch 80 produced in the external face of the root 14, here in the external face of the barrel 26. The limiting notch 80 is limited circumferentially in the first orientation "SA" by a first limiting face 70A, which is intended to limit the rotation of the vane 10 in the first orientation "SA" by contact with the associated first stop face 72A, and in the second orientation "SB" by a second limiting face 70B which is intended to limit the rotation of the vane 10 in the second orientation "SB" by contact with the associated second stop face 72B.

As previously explained, the stop finger 78 is received with circumferential deflection between the two stop faces 72A, 72B such that an angular space "Jc" is reserved circumferentially between each stop face 72A, 72B of the stop finger 78 and the associated limiting face 70A, 70B of the limiting notch 80 when the root 14 of the vane 10 is connected in rotation to the cup 42 by its lower free end 28. More particularly, the stop finger 78 is then arranged substantially equidistant from the two limiting faces 70A, 70B of the associated limiting notch 80.

A radial space "Jr" is also reserved between the free internal end of the stop finger 78 and the bottom of the limiting notch 80 formed in the external face of the root 14. This radial space forms a clearance that allows to facilitate the mounting of the root 14 in the cup 42.

Furthermore, to allow the root 14 to be inserted axially into the cup 42, the limiting notch 80 is open axially downwards so as to receive the stop finger 78 axially.

The invention claimed is:

1. An assembly comprising a propeller vane and a system for setting the pitch of the vane about a pitch setting axis, for an aircraft turbine engine, the vane having a root extending from an upper end connected to a blade of the vane to a free lower end, the system for setting the pitch of the vane comprising a cup which is radially delimited by an annular wall extending around the pitch setting axis, the cup comprising a bottom wall and an upper opening through which the root is intended to be inserted axially into the cup, the free lower end of the root being nested axially into a housing of the bottom wall having a cross-section complementary to that of the free lower end of the root in order to connect the cup and the vane in rotation about the pitch setting axis, wherein the root of the vane comprises at least one radial limiting face which is intended to cooperate with at least one associated radial stop face of the cup in order to limit the rotation of the vane in an orientation about the pitch setting axis with respect to the cup in the event of failure of the lower end of the root.

2. The assembly according to claim 1, wherein the root of the vane comprises:
at least one first radial limiting face of the at least one radial limiting face for cooperating with at least one first radial stop face of the at least one associated radial stop face in order to limit the rotation of the vane in a first orientation about the pitch setting axis with respect to the cup in the event of failure of the lower end of the root; and
at least one second radial limiting face which is intended to cooperate with at least one associated second radial stop face of the cup in order to limit the rotation of the vane in a second orientation about the pitch setting axis with respect to the cup in the event of failure of the lower end of the root.

3. The assembly according to claim 2, wherein the root comprises a body housed in an annular barrel prior to its insertion into the cup, each at least one radial limiting face being formed in one part with the barrel.

4. The assembly according to claim 2, wherein the at least one first radial limiting face and the at least one second radial limiting face are arranged on a common limiting finger which projects radially outwards relative to the root.

5. The assembly according to claim 4, wherein the limiting finger is received in an associated stop notch of the cup which is circumferentially delimited by the at least one first radial stop face and by the at least one second radial stop face.

6. The assembly according to claim 4, wherein a radial space is reserved between the limiting finger and an internal face of the annular wall of the cup.

7. The assembly according to claim 2, wherein the at least one first radial stop face and the at least one second radial stop face are arranged in opposition on a common stop finger which projects radially inwards relative to the annular wall of the cup.

8. The assembly according to claim 7, wherein the stop finger is received in an associated limiting notch of the root which is circumferentially delimited by the at least one first radial limiting face and by the at least one second radial limiting face.

9. The assembly according to claim 8, wherein a radial space is reserved between the stop finger and the root.

10. The assembly according to claim 1, wherein an angular space is reserved between each at least one radial limiting face and its at least one associated radial stop face when the vane is connected in rotation to the cup by means of its free lower end.

11. The assembly according to claim 10, wherein the angular space is between 2° and 10° around the pitch setting axis.

12. The assembly according to claim 10, wherein the angular space around the pitch setting axis is equal to 5°.

13. The assembly according to claim 1, wherein the assembly comprises retention means for axially attaching the root in the cup.

14. The assembly according to claim 13, wherein the root has a bulged stretch, referred to as "bulb", which is arranged axially between the blade and the free lower end, the pitch setting system comprising an annular immobilization ring which is configured to be mounted inside the cup and to cooperate respectively with the bulb and the annular wall of the cup in order to secure the root axially to the cup.

15. The assembly according to claim 14, wherein the root of the vane comprises:
- at least one first radial limiting face of the at least one radial limiting face for cooperating with at least one first radial stop face of the at least one associated radial stop face in order to limit the rotation of the vane in a first orientation about the pitch setting axis with respect to the cup in the event of failure of the lower end of the root; and
- at least one second radial limiting face which is intended to cooperate with at least one associated second radial stop face of the cup in order to limit the rotation of the vane in a second orientation about the pitch setting axis with respect to the cup in the event of failure of the lower end of the root, wherein the at least one radial stop faces and the at least one radial limiting face are arranged axially below the immobilization ring.

16. The assembly according to claim 15, wherein a portion of the at least one radial limiting face is arranged substantially at the level at which the bulb has maximum radial dimensions.

\* \* \* \* \*